Jan. 22, 1957 E. HAUSDORF 2,778,889

TELEPHONE EAR PIECE

Filed June 19, 1953

INVENTOR
ERICH HAUSDORF

Estabrook & Estabrook

ATTORNEYS 2,778,889
Patented Jan. 22, 1957

2,778,889

TELEPHONE EAR PIECE

Erich Hausdorf, Ottawa, Ontario, Canada

Application June 19, 1953, Serial No. 362,699
1 Claim. (Cl. 179—182)

Figure 1:
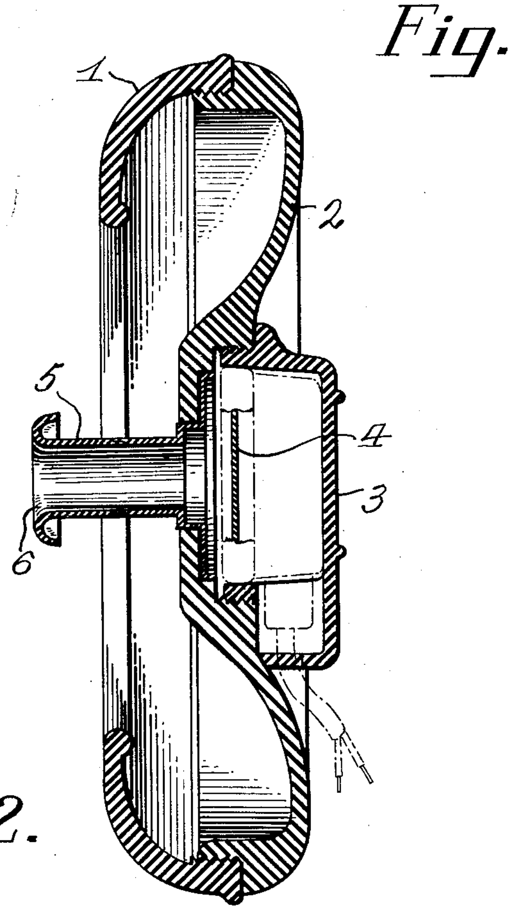

This invention relates to telephone earpieces and, in particular, to a telephone earpiece that surrounds, or partially surrounds, the ear and hangs thereto, said earpiece being provided with an enclosed receiver and a penetrating ear tip.

An object of the invention is to provide an earpiece which is especially suitable for use by the hard-of-hearing and which completely excludes external noise during telephone communication.

An additional object is to accomplish the dual purpose of instantaneously hanging the earpiece on the ear and at the same time obtaining maximum efficiency from the penetration of the ear tip against the outermost end region of the external auditory meatus.

In my prior British patent specification No. 136,511, I disclosed a telephone receiver having an inner cover adapted to enter partially the ear and an outer cover which embraces the ear. A construction of this kind serves to exclude partially external noise and at the same time to secure the receiver to the head. The said inner cover in my prior construction projected only slightly into the external ear, that is to say, into the space within the periphery of the pinna. This gave a more satisfactory transmission than was obtainable with the normal telephone earpiece, which was merely pressed against the outer face of the pinna, but there was the disadvantage that a leakage of sound could not be avoided when the earpiece was hanging freely on the ear. In a steady development I have also disclosed an earpiece of this kind in my British patent specification No. 440,626, wherein improved acoustic effects were obtained by provision of ribs and hammered or roughened parts within the casing. Nevertheless, leakage of sound still persisted because of failure to appreciate at that time the possibility of using a protruding ear tip on the receiver which could be maintained in its proper place against the outermost end of the ear channel merely by the weight of the earpiece alone.

Hearing-aid earpieces have, of course, since been made in which a moulded earpiece shaped to suit the requirements of an individual person is inserted in the external acoustic meatus. With such individually moulded so-called button earphones, which may act partly through the effect of bone-conduction, a high efficiency is attained since sound leakage is substantially eliminated. Instruments of this kind cannot, however, be used in conjunction with a telephone apparatus since each earpiece must be moulded individually to suit the ear of the particular user and, moreover, the application on each occasion requires an excessive time expenditure which is impracticable when using the telephone.

The value of projecting sound into the innermost ear by use of voice tubes or ear tips, particularly for hard-of-hearing persons, is also well known. Protruding or penetrating ear tips on receivers have, for example, been used in headsets to accomplish this purpose. In all cases, however, where protruding or penetrating ear tips have been used heretofore with receivers the attachment of the earpieces to or against the ears was clumsy, awkward and time-consuming. The difficulty of placing and regulating a headset on the head needs on explanation. In any event, these combinations were quite unsuited for telephone use.

According to the present invention, the earpiece includes a moulded ear tip which may be shaped in a variety of ways so as to be applied instantaneously to the outermost end region of the external auditory meatus and has an outer cover or shell adapted to embrace the ear pinna so that the earpiece may hang from the ear without additional support. In one instantaneous motion leakage of sound is completely blocked and maximum efficiency from the receiver within the earpiece is effected.

The reason why there can be no leakage of sound from the voice tube or ear tip and why the full volume of sound can only enter the ear channel is interesting. The protruding voice tube and ear tip which lie coaxial to the receiver are at right angles to the flat plane of the ear cover or shell. The natural weight of the shell, however small, tends to pull at the ear with a downward and slightly outward motion at the top of the pinna resulting in a continuing natural thrust of the ear tip against the outermost end of the auditory meatus ensuring a perfect connection therewith.

As before mentioned, I prefer to use the earpiece or shell that totally surrounds the ear, but it is clear that the same advantages would be gained should the earpiece only partially surround the ear in the form of a segment or arc of the shell.

Although it is possible that the ear tip may be shaped in a variety of ways, I prefer using a spherical and mushroom-shaped tip of soft and flexible rubber as shown in the drawing. With this type of soft pressure, not sharp nor in any way uncomfortable to the user, is exerted at the end of the external auditory meatus so that there is created, in effect, an unbroken tube from the diaphragm of the receiver right into the inner ear. This effect is attained instantly and can be maintained indefinitely without any discomfort or even thought by the user.

Figure 2:
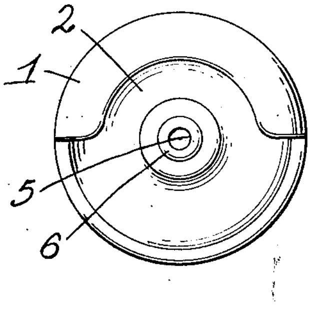

The invention will be described further by way of example with reference to the accompanying drawings wherein, Figure 1 shows an elevation cross-sectional view of a preferred embodiment of the present invention; and Figure 2 shows an elevation view of a similar embodiment at right angles to Figure 1 with the difference that the ear of the wearer is only partially surrounded.

An outer cover or cap 1 is attached by screw threading to a body 2. The case 3 enclosing the usual electromagnetic or dynamic receiver (not shown) is attached to the body 2 in a bore therein at the base of which the diaphragm 4 of the receiver is positioned. A sound tube 5 has an enlarged diameter outer end fixed in the body 2 (shown for illustrative purposes in the drawing as coaxial to the diaphragm 4) and its inner end 6 is of partially spherical or mushroom shape forming an eartip adapted to bear against the outer region of the external auditory meatus.

In use the earpiece is simply hung on the ear and the moulded tip automatically closes the external auditory meatus without any further or special adjustment. Sound leakage is avoided and high efficiency obtained.

In addition, the surrounding cap or cover 1 and parts of the body 2 constitute a shell which excludes any external noise whatsoever. The user's sole attention is directed only to the output of the receiver.

The earpiece is particularly suitable for use as an auxiliary or additional telephone receiver earpiece and for such purposes may or may not be provided with additional amplification. The interior of the body and/or cap may be provided with irregularities such as ribs or hammered or roughened parts for improving the sound transmission and reflection in accordance with my prior British patent specification No. 440,626, although this is not altogether necessary except possibly in certain rare instances when an ear may be so irregularly shaped within that a slight leakage of sound does occur, and when all acoustical benefits should therefore be provided.

I claim:

A telephone earpiece for use in conjunction with the human ear, comprising an annular shell having an inwardly turned flange for engaging the pinna and designed for support by the upper part of the junction of the pinna and the ear, a receiver chamber adapted to hold a device for transforming electrical signals into audible signals centrally disposed in said shell and a sound tube having an ear tip communicating with the interior of said receiver chamber, and protruding from said receiver chamber perpendicularly with respect to said shell to a distance beyond said shell whereby the location of the center of gravity of the earpiece causes thrust of the ear tip against the auditory meatus, said sound tube and ear tip being symmetrical with respect to an axis passing through the center of the sound tube, and said tip having a cross-sectional shape of a semicircle of revolution.

References Cited in the file of this patent

UNITED STATES PATENTS

| | | |
|---|---|---|
| 2,403,418 | Volkmann | July 2, 1946 |
| 2,513,985 | Woodruff et al. | July 4, 1950 |
| 2,529,562 | Martin | Nov. 14, 1950 |